(12) United States Patent
Basalamah

(10) Patent No.: US 9,460,615 B2
(45) Date of Patent: Oct. 4, 2016

(54) AUTOMATIC UPDATE OF CROWD AND TRAFFIC DATA USING DEVICE MONITORING

(71) Applicant: UMM AL-QURA UNIVERSITY, Makkah (SA)

(72) Inventor: Anas Basalamah, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 0 days.

(21) Appl. No.: 14/412,358

(22) PCT Filed: Dec. 16, 2014

(86) PCT No.: PCT/IB2014/002796
§ 371 (c)(1),
(2) Date: Dec. 31, 2014

(87) PCT Pub. No.: WO2016/038415
PCT Pub. Date: Mar. 17, 2016

(65) Prior Publication Data
US 2016/0078756 A1    Mar. 17, 2016

Related U.S. Application Data

(60) Provisional application No. 62/049,927, filed on Sep. 12, 2014.

(51) Int. Cl.
*G08G 1/01*    (2006.01)
*G08G 1/09*    (2006.01)
(Continued)

(52) U.S. Cl.
CPC ............ *G08G 1/0125* (2013.01); *G08G 1/012* (2013.01); *G08G 1/0108* (2013.01);
(Continued)

(58) Field of Classification Search
CPC ........ G08G 1/01; G01C 21/32; G01C 21/34; G06F 15/173
USPC .................. 701/117, 118, 119, 400; 709/223
See application file for complete search history.

(56) References Cited

U.S. PATENT DOCUMENTS 4,812,843 A    3/1989 Champion, III et al.
6,150,961 A *  11/2000 Alewine .................. G08G 1/01
                                              340/905
(Continued)

FOREIGN PATENT DOCUMENTS

EP    2 674 722 A2    12/2012

OTHER PUBLICATIONS

International Search Report and Written Opinion issued May 26, 2015 in PCT/IB2014/002796 (submitting English translation only).

*Primary Examiner* — Tan Q Nguyen
(74) *Attorney, Agent, or Firm* — Oblon, McClelland, Maier & Neustadt, L.L.P.

(57) ABSTRACT

A first mobile monitoring system includes one or more mobile monitoring devices, a network, a server and a storage memory. The server is implemented to analyze the collected signals and the traffic information to identify at least one traffic flow according to travel routes of the one or more wireless devices; determine whether the identified at least one traffic flow exceeds an updating threshold based on the collected signals; derive at the server when the traffic flow exceeds the updating threshold, an updating priority indicating an order in which the traffic flows are processed based on the collected signals; and update a dynamic traffic transportation plan map based on the at least one traffic flow, the updating threshold and the updating priority.

20 Claims, 13 Drawing Sheets

(51) Int. Cl.
*H04W 4/04* (2009.01)
*H04L 12/26* (2006.01)
*H04W 4/00* (2009.01)
*G01C 21/32* (2006.01)

(52) U.S. Cl.
CPC ......... *G08G 1/0112* (2013.01); *G08G 1/0116* (2013.01); *G08G 1/0133* (2013.01); *G08G 1/0141* (2013.01); *G08G 1/09* (2013.01); *H04L 43/16* (2013.01); *H04W 4/008* (2013.01); *H04W 4/046* (2013.01)

(56) References Cited

U.S. PATENT DOCUMENTS

| | | | |
|---|---|---|---|
| 6,317,686 B1* | 11/2001 | Ran | G01C 21/3691 701/117 |
| 7,356,392 B2* | 4/2008 | Hubbard | G08G 1/0104 340/905 |
| 7,912,628 B2 | 3/2011 | Chapman et al. | |
| 8,280,617 B2 | 10/2012 | Young et al. | |
| 8,594,915 B2 | 11/2013 | Sakhpara | |
| 9,257,041 B2* | 2/2016 | Scofield | G08G 1/0104 |
| 2002/0116118 A1* | 8/2002 | Stallard | G08G 1/01 701/117 |
| 2003/0236818 A1* | 12/2003 | Bruner | G01C 21/34 709/200 |
| 2010/0094532 A1 | 4/2010 | Vorona | |
| 2012/0276847 A1 | 11/2012 | Peterson | |
| 2013/0013178 A1* | 1/2013 | Brant | G08G 1/0116 701/117 |
| 2013/0311076 A1 | 11/2013 | Mieth et al. | |
| 2013/0317744 A1 | 11/2013 | Mieth et al. | |
| 2014/0278026 A1* | 9/2014 | Taylor | G08G 1/08 701/117 |
| 2015/0262477 A1* | 9/2015 | Fowe | G08G 1/0133 701/118 |

* cited by examiner

AUTOMATIC UPDATE OF CROWD AND TRAFFIC DATA USING DEVICE MONITORING

CROSS-REFERENCE TO RELATED APPLICATIONS

This application claims the benefit of priority from U.S. Provisional Application No. 62/049,927 filed Sep. 12, 2014, the entire contents of which are incorporated herein by reference.

BACKGROUND

Local governments such as municipalities and transportation offices regularly need to estimate crowds and traffic in certain locations and to update traffic control maps accordingly. These plans are updated in maps and dictate certain changes in traffic routing during major events, accidents and evacuation, such as Sunday markets, movie theater shooting or some major construction. If planned well, the updates can be finished in advance and be publicly advertised to citizens.

However, there are cases where major events occur such as pilgrimage and evacuation during terrorist attack, where it becomes very difficult to predict the changes in routes, and update traffic maps and estimate crowds instantaneously to reflect those real-time changes. In these situations, decisions have to be made at real-time and organizers need to make instant choices whether to close the road segment, turn it to one-way, reduce entries, or classify entry based on specific type of vehicles.

SUMMARY

For one embodiment, there is provided a method implemented by a traffic update method implemented by a mobile monitoring system including in part a server and at least one monitoring device, comprising: collecting, at the at least one monitoring device, signals emitted from one or more wireless devices; collecting, at the server, traffic information from at least one of satellite, radio channel and network sources; analyzing, at the server, the collected signals and the traffic information to identify at least one traffic flow according to travel routes of the one or more wireless devices; determining, at the server, whether the identified at least one traffic flow exceeds an updating threshold based on the collected signals; deriving, at the server, when the traffic flow exceeds the updating threshold, an updating priority indicating an order in which the traffic flows are processed based on the collected signals; and updating, at the server, a dynamic traffic transportation plan map based on the at least one traffic flow, the updating threshold and the updating priority.

For another embodiment, there is provided a method implemented by a mobile monitoring system for automatically detecting unique identifier (ID) from wireless devices, comprising: collecting, at a receiver of a monitoring device, one or more information packets transmitted from one or more wireless devices; determining, with processing circuitry of the monitoring device, whether the collected packets exceed a packet-threshold to determine whether or not to extract a unique ID for each of the one or more wireless devices; invoking, with the processing circuitry and when it is determined that the collected packets do not exceed the packet threshold, more information packets to be transmitted from the one or more wireless devices until the invoked information packets exceed the packet-threshold; extracting, with the processing circuitry, the unique IDs from the information packets that exceed the packet-threshold; inferring, at a server, a crowd density and traffic condition based on the unique IDs; and transmitting, from the server, a traffic estimation to the one or more wireless devices based on the crown density and traffic condition.

DETAILED DESCRIPTION

During major events, accidents and evacuations, local government agencies need to update their traffic maps to reflect real-time route updates. At such moments, an automatically updated traffic map that reflects the changes after each decision is made may provide great usage for the event organizers. An exemplary traffic map as described herein may be a municipal based traffic scheme for indicating various traffic flows in certain districts. The updated traffic map includes both vehicle and pedestrian traffic such as for example, when millions of worshippers are entering or leaving a large stadium, a parade or a Holy mosque. A decision of whether to allow more people to enter the site depends on the current capacity and dynamics of the event. Organizers have to make dynamic decisions and need a dynamic updated map that may automatically cope with these changes and transmit update traffic maps back to the citizens so that they can easily use to navigate and decide their own route. Thus it is desired for local government agencies such as municipalities and transportation offices to update their traffic control plan maps to reflect real-time route updates.

Furthermore, conference organizers sometime need to estimate the number of attendees during each session for statistical purposes in a conference room, or stadium, mosque or a street. Also comparing the same crowd over time is significant by itself since the conference organizers may only be concerned with ratio of people detected out of the peek crowd. An exemplary mobile monitoring device and associated methodology will now be described with respect to FIGS. 1-5.

Figure 1:
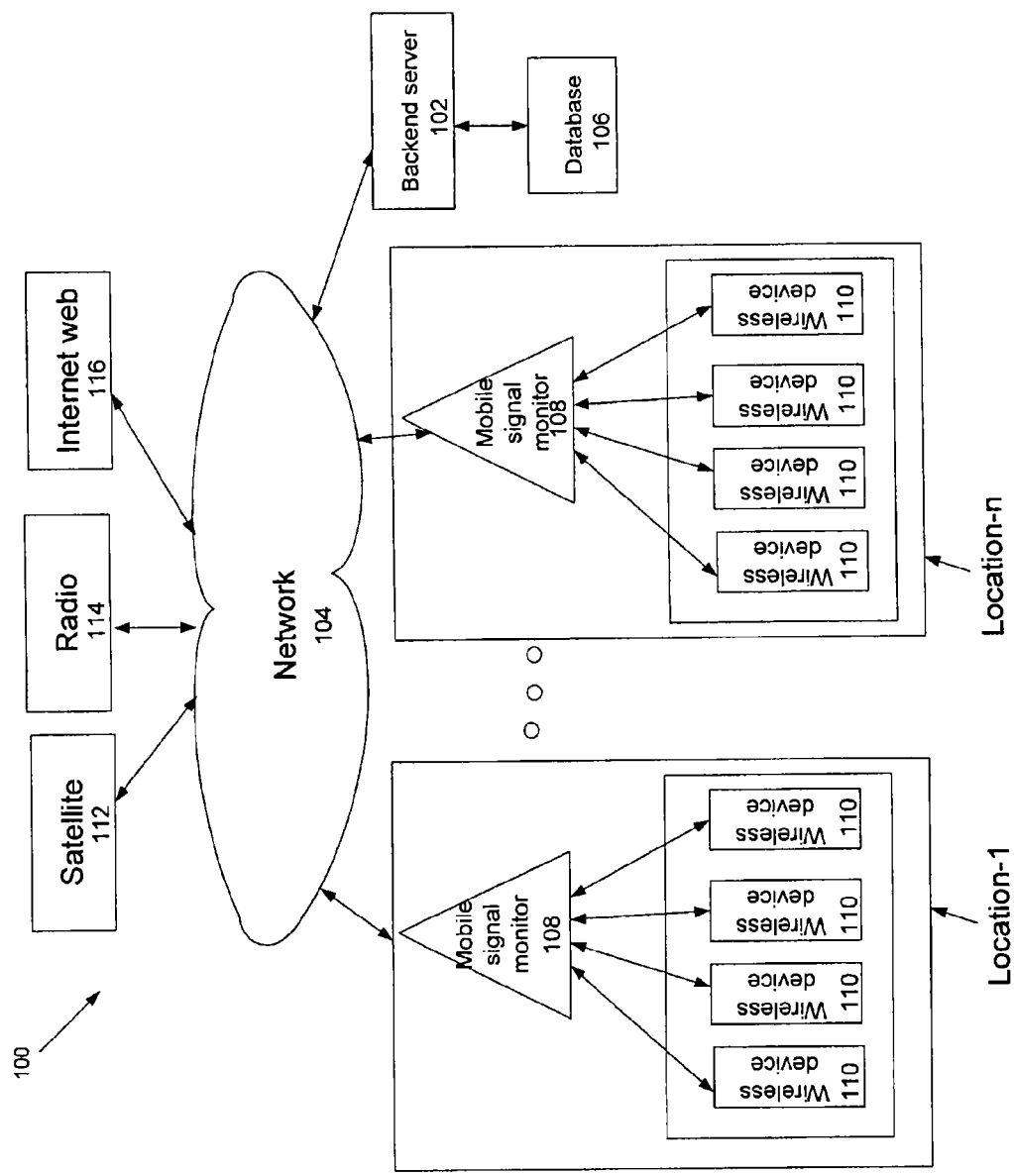
FIG. 1 is a schematic diagram of one embodiment of an automatic map updating system according to one example.

FIG. 1 is a block diagram of an exemplary automatic traffic map updating system 100 which may communicate routing information and update the traffic map. The system 100 includes a backend server 102, a network 104, a database 106 and a plurality of mobile signal monitors 108. In selected embodiments, the backend server 102 can collect traffic information from wireless devices 110, from at least one of satellites 112, radio channels 114 and/or internet websites 116. Although in selected embodiments, the automatic traffic map updating system 100 may include a single mobile signal monitor 108 and/or multiple backend servers 102, networks 104 and databases 106.

The traffic map displays traffic information of a geographical area with color-coded information about current traffic congestions at places that typically have large amounts of traffic and/or where traffic changes are expected along a route of travel of pedestrians or vehicles. Icons may be positioned in the map to indicate location-specific data for the number of the vehicles, pedestrians, incidents, or traffic jams. Further, the traffic map can provide information such as construction phasing, closure schedules and alerts from the radio 114 and internet websites 116. Each of these items of information is associated with a road segment and presented to the user periodically or based on a user's request.

In selected embodiments, the mobile signal monitors 108 are positioned at places that typically have large amounts of traffic and/or where traffic changes are expected along a route of travel of pedestrians or vehicles. However, the mobile signal monitors 108 may also be positioned based on the risk profile of an area or a historical profile of the area. For brevity and ease of understanding, the term mobile signal monitor 108 may be used interchangeably with the term "monitors 108". The monitors 108 can detect mobile signals emitted from wireless devices 110, such as mobile phones or vehicle devices, of vehicle occupiers or pedestrians. Once activated, these monitors 108 are programmed to continually monitor the traffic flow of the various types of traffic. For example, in selected embodiments, the monitors 108 are capable of receiving all current wireless transmission signals from wireless devices 110. Wireless devices 110 can include, but are not limited to, cell phones, laptops, PDAs, and any other wireless device 110 capable of emitting wireless signals as would be understood by one of ordinary skill in the art. The transmission signals of the wireless devices 110 include in selected embodiments a mobile signal, a WiFi signal, a GPS signal, a bluetooth signal, a zigbee signal, a 3G signal, a 4G signal, a 5G signal or any other wireless signal that can be detected and decoded as would be understood by one of ordinary skill in the art. Wireless devices 110 can also include items located in the vehicles such as a radio or vehicle computer.

The monitors 108 search for a wireless device's 110 transmissions and identify and record locations of the wireless devices 110 through their unique identifiers. In selected embodiments, this unique identifier in GSM could be the wireless device's 110 Temporary Mobile Subscriber Identity (TMSI), International mobile Subscriber Identity (IMSI), Temporary International Mobile Subscriber Identity (TIMSI), or International Mobile Station Equipment Identity (IMEI). For Bluetooth or WiFi, the unique identifier could be the mobile device's media access control (MAC) address. The unique identifiers, along with other information such as the time that communications are detected through the monitors 108 can then be sent via the network 104 connection to the backend server 102 for processing and potential storage in the database 106. The backend server 102 combines the data from a monitor 108 for a particular unique identifier and calculates the position of the corresponding wireless device 110 at that instant in time. To determine the position, the signal from the wireless device 110 can be received by a receiver of the monitors 108, and the angle of the arrival of the wireless signal can be calculated from the difference in phase of the monitors 108. Further, the monitors 108 can include phase array antennas, by which the angle of incident of the received signal from the mobile device can be determined in order to determine the position of the wireless device 110.

Based on the detected wireless signals and the known position and orientation of the mobile monitor device, the direction or the area of the wireless device 110 can be calculated. For instance, signals from a wireless device 110 received at two different monitors 108 at approximately the same time can be triangulated to obtain an accurate fix of the location of the wireless device 110 at that time. When the two times fall within a time window of predetermined width, it is determined that the signals can be used to determine the location. If the times do not fall within the window, then the data is discarded. If there is direction data from only one wireless device 110, the monitors 108 can use the messages it receives to determine the transit time of each message and compute the distance to each mobile signal monitor using the speed of wireless signal transmission. Alternatively, or in addition to, the monitors 108 can send a request signal to the corresponding wireless device 110 requesting position information of the wireless device 110. Further, the monitors 108 may also detect signals and identify location information from navigation devices, such as GPS.

The backend server 102 can communicate with the monitors 108 through the network 104, such as internet. The backend server 102 analyzes the collected traffic information, generates updated traffic maps and provides these maps to the event organizers as described further herein. The collected traffic information is either emitted from wireless devices 110, or from at least one of satellites 112, radio channels 114 and the Internet 116. As described further herein, the backend server 102 identifies at least one traffic flow according to route changes of the one or more wireless devices 110 based on collected traffic information from the monitors 108, determines when the identified traffic flow exceeds an updating threshold, derives an updating priority of the traffic flow and updates a dynamic traffic transportation plan map based on the identified traffic flow, the updating threshold and the updating priority. Therefore, the event organizers may determine the real-time traffic control options based on a dynamically updated traffic map.

Furthermore, alternatively or in addition to, the backend server 102 may dispatch updated traffic maps information back to the owners of the wireless devices 110 through the network 104 and/or the monitors 108. Thus, the owner of these wireless devices 110 can obtain the updated traffic maps and decide their own routes based on the updated traffic information. This allows organizers to readily identify alternative traffic routes for pedestrians and vehicles alike to alleviate traffic congestion and/or allows owners of the wireless devices 110 to easily identify alternative routes to save time in their travel while also providing a potentially safer traveling route. Thus, via the updating of the traffic maps and the provision of alternative routes, traffic congestion in highly traveled areas can be reduced. Further, for people traveling to specific locations, these locations are guaranteed to have better attendance due to reduced traffic which results in better organization and happier customers and/or travelers.

Moreover, in addition to or alternatively, in selected embodiments the backend server 102 can use traffic information obtained from other sources, such as satellite(s) 112, radio channel(s) 114 and internet websites 116.

Satellite images show the surface of the earth at the instant at which they were taken. The backend server 102 uses a reference map such as a Google™ map as a basis and compares the instant satellite image obtained through the network with the Google™ map. The Google™ maps that are used as a basis in comparison may contain no traffic or light traffic. The backend server 102 may analyze the traffic information from the satellite image and integrates that information to update the traffic map. Further, traffic information itself may be received from these maps and/or other sources that provide traffic information to supplement the information provided by the wireless devices 110. In other words, wireless devices 110 that are located at the areas of traffic themselves will provide highly accurate traffic update information but alternative sources of traffic information may be utilized to supplement and confirm accuracy of the traffic update information generated by the wireless devices 110.

Moreover, the backend server 102 may monitor radio channels through the network 104 and obtain the traffic information. The backend server 102 may use voice recognition and search technique as would be understood by on of ordinary skill in the art to collect traffic congestion information at interested locations. The voice-to-text conversion technique may be performed as described in U.S. Pat. No. 7,103,154, the entire contents of which are herein incorporated by reference. When the radio channels report traffic congestion at certain area, the backend server may increase an updating priority of the traffic map at that certain area alone or based on a comparison of the traffic information obtained from the wireless devices 110.

The backend server 102 may selectively update the traffic information for locations with a higher updating priority at an earlier time than for locations with a lower updating priority. In one embodiment, the updating priority can be set to three levels, such as a high level, a medium level and a low level.

For example, a high level updating priority can be set only when the number of the vehicles and/or pedestrians is high multiple of the updating threshold, such as 5 or greater times of the updating threshold. The medium level updating priority can be set when the number of the vehicles and/or pedestrians is 2 to 4 times the updating threshold. The low level updating priority can be set when the number of the vehicles and/or pedestrians is less than 2 times the updating threshold. Other thresholds may be used such that a certain factor of the update threshold indicates the updating priority. In other words, for a suburb area, a lower range of the priority threshold value can be used. However, for an urban area, a higher range of the priority threshold value can be used. Furthermore, the accuracy of satellite image comparison may be sufficient to differentiate between the suburb area as compared to the urban area or these areas may be determined in advance by the backend server 102 and saved in the database 106.

The different updating priority levels allow organizers to identify an order or priority in which traffic areas should be updated with alternative routes on the traffic maps. Organizers can quickly identify which areas are causing the worst traffic and take steps to provide alternative routes for travelers in these areas first. Further, traffic issues arising out of a safety concern such as a terrorist attack or natural disaster may automatically obtain the highest update priority regardless of the updating threshold. Weather patterns such rain and/or snow may automatically be set to fall within a predetermined updating priority.

Furthermore, the backend server 102 may search the Internet 116 and collect traffic congestion information at interested locations as would be understood by one of ordinary skill in the art. Internet crawling and parsing of data may be performed as described in U.S. Pat. No. 7,799,293, the entire contents of which are herein incorporated by reference. When the internet websites report traffic congestion at certain area, the backend server 102 may increase the updating priority of the traffic map at that certain area based on the reports alone or in conjunction with the number of vehicles and/or pedestrians reported by the monitors 108.

Therefore, the backend server 102 receives information from a plurality of sources including, but not limited to, in selected embodiments the monitors 108, satellite information 112, radio channels 114 and websites 116. The backend server 102 then utilizes all of this information to update traffic map information based on the information received thereby identifying traffic changes or congestion at predetermined locations near the monitors 108. Further, various techniques could be used to identify the accuracy of the traffic information from the monitors 108. For example, different tiers of accuracy could be identified for each area of traffic congestion for which an update of the traffic map is required. For example, if a predetermined amount of monitors 108 in one area confirm that traffic congestion has increased in an area near the monitors 108 then the backend server 102 may identify this information as a tier 2 accuracy level as it is based on information from the monitors 108 in the area which are receiving signals directly from the wireless devices 110 of the traffic-causing entities such as pedestrians and/or vehicles.

Other tiers are contemplated in exemplary embodiments. For example, a tier 1 accuracy could be identified by the backend server 102 if the monitors 108 identify an area in which traffic congestion has increased/decreased and traffic information from one or more satellites 112 confirms this reading. Tier 2 accuracy could also be identified based on data received from just the radio 114 or websites 116. However, the alternative sources of traffic information could themselves be prioritized so that the tier accuracy is based on the alternative source. For example, satellite information 112 in conjunction with the traffic information identified by the monitors 108 could indicate tier 1 accuracy whereas radio information 114 in conjunction with the traffic information identified by the monitors 108 could indicate tier 2 accuracy. This may be because traffic information identified from the radio 114 may be considered more accurate as it is often based on news reports from helicopters or reports that have specifically identified traffic in that area whereas satellite imagery may be delayed or processed incorrectly by a computer system.

The tiered accuracy system can be used by the operators of the wireless devices 110 or event organizers receiving reports from the backend servers 102 to quickly identify which sources of information may be more accurate thereby enabling them to sequentially address traffic concerns in a prioritized way. Further, the backend server 102 may not perform any updates on the traffic control maps depending on a predetermined accuracy level. For example, information received from satellites 112 and/or the Internet 116 may, in select embodiments, not be enough to trigger an update of the traffic control map whereas information from the Radio 114 may trigger the updating of the traffic control map. In select embodiments, the combination of data from the satellite 112 data and/or Internet 116 and/or radio 114 with the data from the monitors 108 can meet a predetermined level of accuracy such that the traffic control maps are updated by the backend server 102. Furthermore, in select embodiments, information obtained solely from the monitors 108 is sufficient for the backend server 102 to perform processes for updating a traffic control map.

Figure 2:
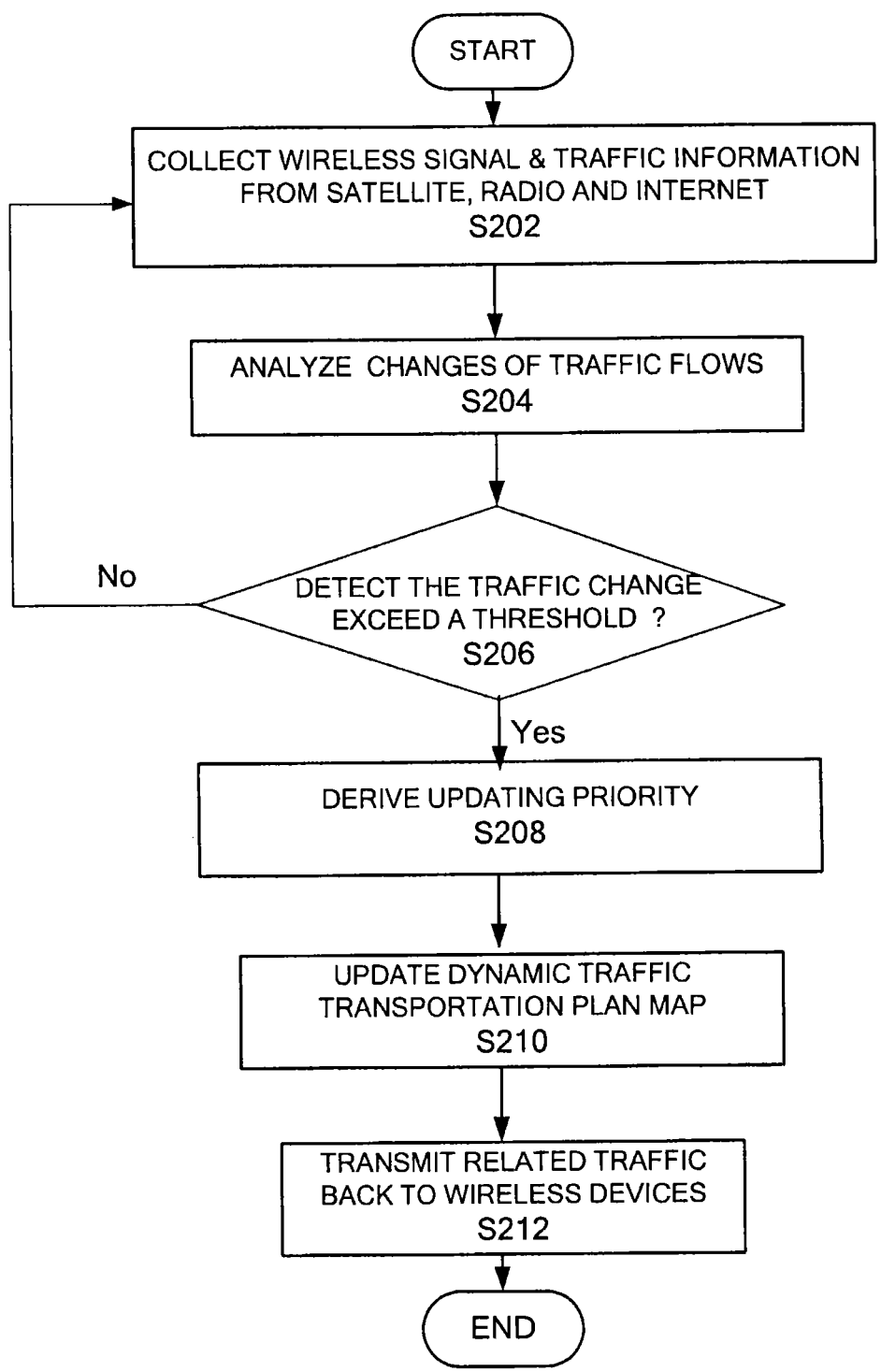
FIG. 2 is a flowchart diagram of the operation for automatically updating a traffic map according to one example.

Referring to FIG. 2, a flowchart describing a method for automatically updating traffic map according to one example is shown.

In step 202, processing circuitry of the backend server 102 collects signals emitted from one or more wireless devices 110 and/or the traffic information from at least one of satellites 112, radio channels 114 and internet websites 116 for locations corresponding to the locations of the monitors 108.

In step 204, the processing circuitry analyzes the collected signals and the traffic information from the satellite to identify traffic flows according to route changes of the one or more wireless devices 110. For example, in select embodiments, the backend server 102 can utilize the timing of signals received from the wireless devices 110 via the monitors 108 as well as the position data for the wireless devices 110 over time to determine the number of wireless devices 110 in a particular area as well as the flow directions of the wireless devices 110. Further, based on the determined traffic flow paths of the wireless devices 110, the backend server 102 in select embodiments can filter the traffic flows to only process traffic flows in a certain direction or within a certain geographic boundary.

In step 206, the processing circuitry of the backend server 102 determinates whether the traffic changes exceed an updating threshold indicating the number of vehicles and/or pedestrians within a predetermined area. The updating threshold is set in advance and can be predetermined for various locations based on the population, number of registered vehicles within a predefined geographic location and/or based on historical traffic information for the region. Accordingly, for densely populated areas, such as cities, the updating threshold is set higher than areas that are less populated such as towns. Further, the area may relate to an area which only receives heavy traffic at certain times of the year and therefore registration data of vehicles and seasonal information can be utilized to determine the updating threshold. For example, if the area is located next to a lake but has harsh winters, the updating threshold may be low for the winter timeframe but be higher in the summer when there will be more people and more vehicles in operation in the area. Accordingly, the update threshold can be temporally set based on the time of day of time of year. If the detected number of vehicle or pedestrians exceeds the updating threshold, the processing circuitry derives the updating priority in step 208.

Further examples of the updating threshold, in addition to or alternatively from the described above are as follows. The updating threshold for vehicle can be the number of vehicles that reflects a traffic flow at the interested locations without traffic jams. The updating threshold for pedestrian is the number of pedestrians that reflects a pedestrian density in the location of the monitor system without traffic jams. The processing circuitry may not update traffic when the number of vehicles or the number of the pedestrians is below the update threshold in a particular area. The processing circuitry selectively updates the traffic map when the changes of the traffic exceed the updating threshold. The updating threshold may be set equal to a value that is based on road conditions.

For example only, the updating threshold for vehicles may be set equal to approximately 4 or 5 vehicles to eliminate normal traffic flow. Additional higher thresholds such as 10-15 or higher vehicles can be used instead of or in addition to the lower threshold. If multiple thresholds are employed, the threshold may be assigned a measure of certainty. In other words, for a two-lane road, a lower updating threshold value can be used. However, for a four-lane road, a higher threshold such as 15 vehicles may be used to reflect average vehicles in each lane. Other thresholds may be used. Furthermore, the accuracy of satellite image comparison may be sufficient to differentiate between the two-lane road as compared to the four-lane road. Additionally, when the monitors 108 are placed at particular locations, the updating threshold may be programmed into them by the operator based on the location in which they are placed. The updating thresholds can also in selected embodiments be updated remotely by submitting commands to the backend server 102 which is connected to the monitors 108 via the network 104.

Furthermore, the updating threshold for pedestrian traffic may be set equal to approximately 15 or 20 pedestrian to eliminate normal pedestrian flow. Additional higher thresholds such as 30-45 pedestrian or higher can be used instead of or in addition to the lower threshold. If multiple thresholds are employed, the threshold may be assigned a measure of certainty. In other words, for a suburb area, a lower updating threshold value can be used. However, for an urban area, a higher threshold such as 45 pedestrian may be used to reflect average people flow in downtown area. Other thresholds may be used based on the event itself or a particular location itself. For example, on a particular day for a particular event the update threshold may be increased as increased amounts of traffic are expected. Furthermore, the backend server 102 may be differentiates between the suburb area as compared to the urban area based on the amount of wireless signals located in these area. The backend sever 102 may also differentiate the suburb area as compared to the urban area based on the accuracy of the satellite images.

Alternatively, or in addition to, in selected embodiments, the monitors 108 may be placed ahead of time before an event to identify typical flows of traffic when the event is not taking place. Based on these flows of traffic an update threshold can be set based on an average of the typical flow of traffic over a predetermined period of time. This update threshold or a normalized update threshold modified by a certain factor based on the amount of people expected at the event can be used as an update threshold.

In step 208, the processing circuitry derives the updating priority of the traffic flow based on the traffic information obtained from the satellite, the radio channels and the internet websites as described previously herein. For example, certain areas of traffic may have priority for being updated over other areas based on various factors such as preference, tier, weather and/or safety considerations.

In step 210, the processing circuitry updates the dynamic traffic transportation plan map based on the identified traffic flow and the updating priority information to provide a transportation map that users can use to take alternate routes. The processing circuitry may selectively update the traffic information for locations with a higher updating priority at an earlier time than for locations with a lower updating priority.

In step 212, the processing circuitry transmits the updated traffic map back to the wireless devices 110 and/or monitors 108.

The updated traffic map may be analyzed from cumulative information collected from the monitors 108 which are located at the sites where traffic changes are expected. The wireless devices 110 of the vehicle occupier and the pedestrians carry unique identifiers such as MAC address or TMSI. Each monitor 108 may detect a number of vehicles or a number of pedestrians at its coverage range based on the unique identifiers from mobile devices. With the available cumulative collected about the traffic expected sites, the backend server 102 can detect the flow of people and infer the changes in routes, and then auto update the maps automatically.

Figure 3A:
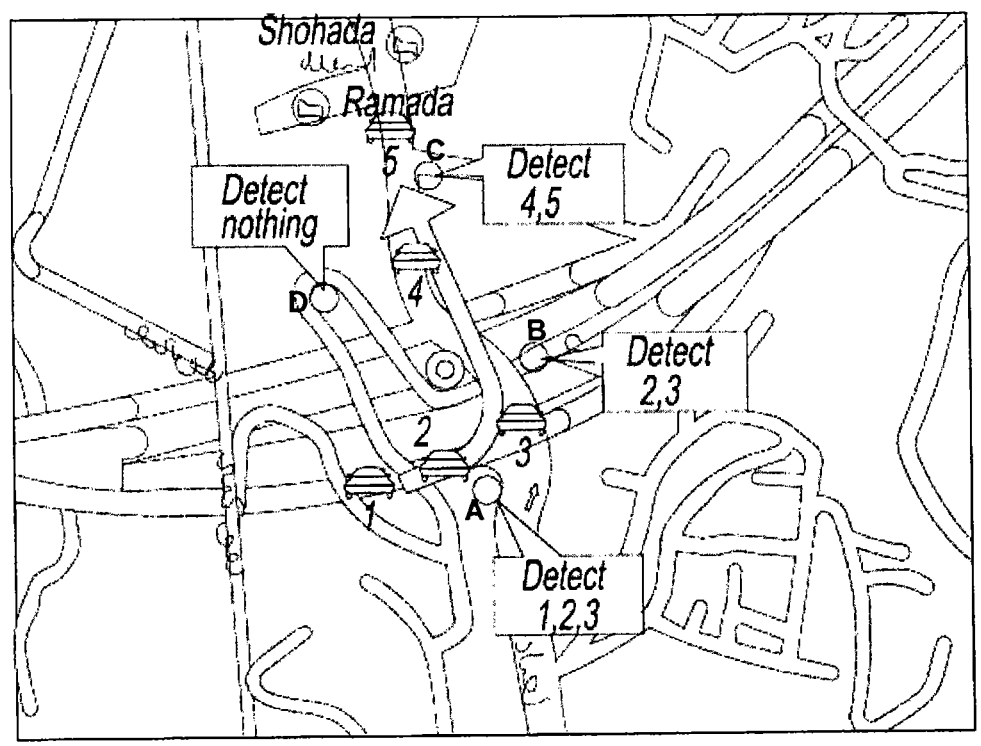
FIG. 3A, FIG. 3B and FIG. 3C illustrate methods of inferring traffic routes according to one example.
Figure 3B:
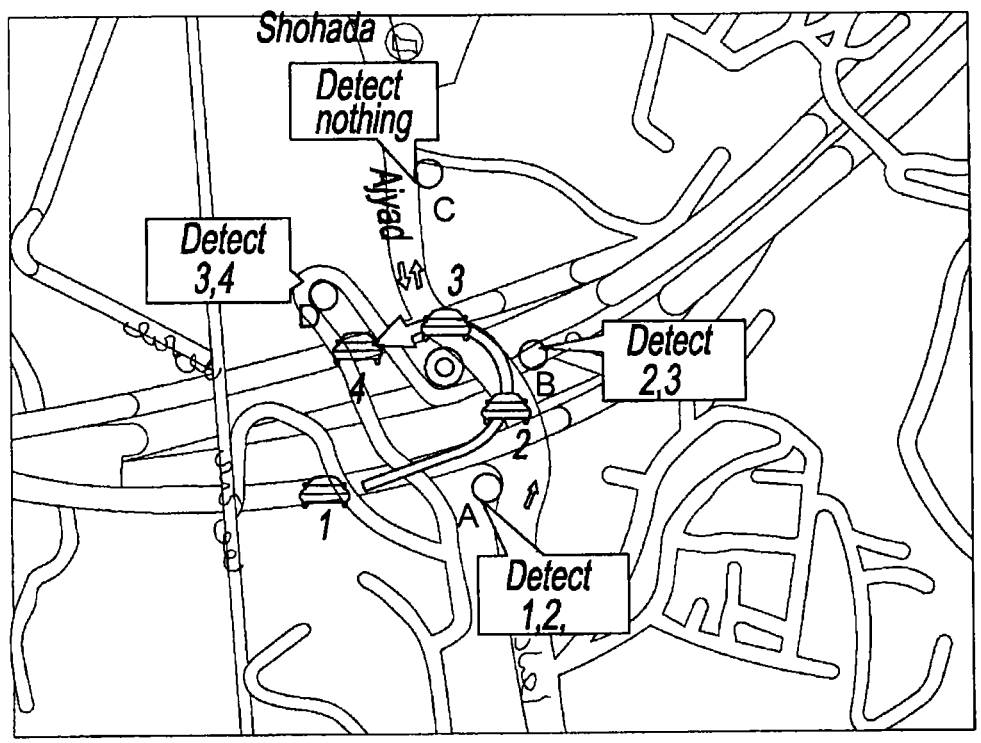
Figure 3C:
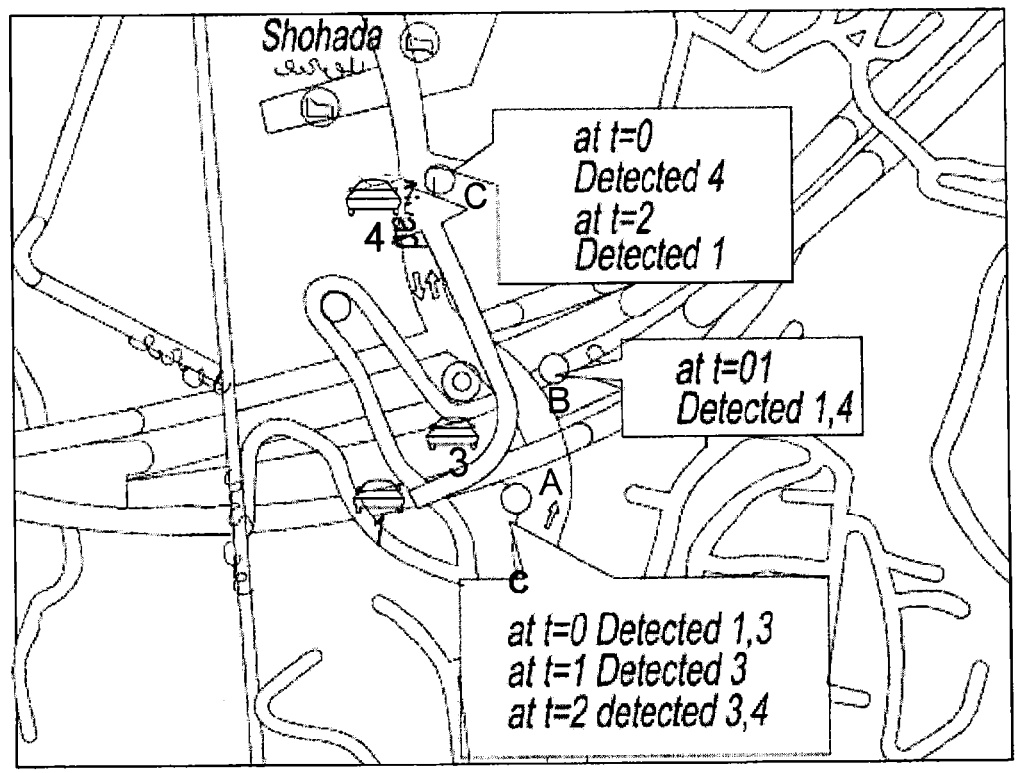

FIG. 3A, FIG. 3B and FIG. 3C show one embodiment of the method for monitors 108 to filter out unwanted wireless signals based on the collected cumulative direction patterns.

FIG. 3A shows one time-stamp of the traffic information. A monitor 108 positioned at location A detects vehicle 1, vehicle 2 and vehicle 3; a monitor 108 positioned at location B detects vehicle 2 and vehicle 3; a monitor 108 positioned at location C detects vehicle 4 and vehicle 5, and a monitor 108 positioned at location D detects nothing. The backend server 102 may infer from a collective information from FIG. 3A that a traffic route updating includes A, B and C, is needed if the number of vehicles and/or pedestrians detected by the monitors 108 and analyzed by the backend server 102 exceeds the update threshold set for that area. Since the location D is not in the interested traffic route, the updating of the traffic map of the location D is not needed.

FIG. 3B shows another time-stamp after the changes of traffic illustrated in FIG. 3A. The monitor 108 at the location A detects vehicle 1 and vehicle 2; the monitor 108 at location B detects vehicle 2 and vehicle 3; the monitor 108 at the location C detects nothing, and the monitor 108 at the location D detects 3 and 4. Accordingly, based on movement of the vehicles as illustrated in FIG. 3B, the vehicles detected by the monitors 108 changes as does the traffic flow directions and traffic densities. Accordingly, the backend server 102 may infer from collective information from FIG. 3B that another traffic route includes the routes traveled by vehicles near A, B and D, but without C. In this case, the monitors 108 will update the traffic information at the location A, B and D. Since the location C is not in the interested traffic route, the updating of the traffic map of the location C is not needed.

Real collected signals may include plenty of other sources for mobile data such as pedestrians and vehicles traveling the opposite direction. The collected cumulative direction patterns may filter out those unwanted signals based on the flow and direction of traffic. FIG. 3C shows one embodiment of using the collected cumulative direction patterns to infer the routes according to one example. The monitors 108 may programmed to detect vehicles at a first time slot t=0, a second time slot t=1 and a third time slot t=2 and as many time slots up to a predetermined amount. In this example, users are interested in a traffic route directed from south to north as indicated in arrow in FIG. 3C. The vehicle 4 is detected with the pattern that includes t=0 at location C, t=1 at location B, and t=2 at location A, and this pattern indicates a route that goes from the north to south. The vehicle 3 is detected with the pattern that includes t=0 through t=2 all at location A, and this pattern indicates that the vehicle 3 is stationary. Only vehicle 1 is detected with the pattern that includes t=0 at location A, t=1 at location B, and t=2 at location C, and this pattern indicates a route that goes from the south to north as the users are interested. Therefore, the backend server 102 will update the traffic information in location A, B, C accordingly, since the user will be interested in this route. As such, the back end server 102 may also determine that there is traffic near the monitor 108 positioned at location C as vehicle 3 has not moved over the various time frames. Accordingly, the monitor 108 may report this information to the backend server 102 along with information indicating the number of vehicles and/or pedestrians in the area and on each route such that the back end server may, based on the update priority for this corresponding area, update the traffic map to avoid the route taken by vehicle 3 thereby providing alternative routes to owners of the wireless devices 110 while also lowering congestion in the area.

Figure 4A:
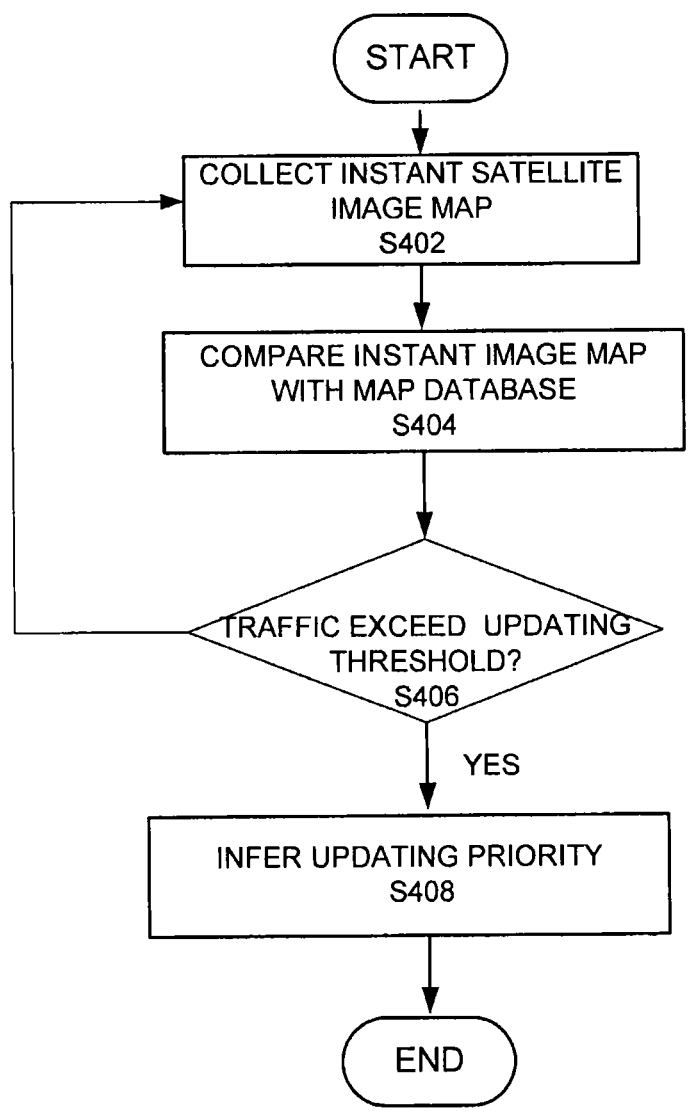
FIG. 4A, FIG. 4B and FIG. 4C are flow charts illustrating methods of deriving updating priority processes according to one example.

FIG. 4A shows a flowchart describing a method for collecting and inferring the traffic information from the satellite.

In step 402, the processing circuitry of the backend server 102 receives instant satellite image from one or more satellites linked to the backend server 102 or through another system.

In step 404, the processing circuitry compares the instant satellite image to a reference with no traffic or light traffic, such as a google map. For example, the reference image may be on determined to indicate normal traffic for that area based on time lapsed previous frames over a predetermined period of time.

In step 406, the processing circuitry determines whether a difference of a number of the vehicles or the pedestrians exceeds an updating threshold at the interested locations. Accordingly, the backend server 102 analyzes the image to determine the number of cars and/or pedestrians within the image as would be understood by one of ordinary skill in the art. If the difference in the amount of vehicles and/or pedestrians in the current image as compared to the number of vehicles and/or pedestrians in the reference image exceeds the updating threshold, the processing circuitry determines that an updated traffic control map must be generated in an order based on the updating priority as described previously herein.

As described herein, the updating threshold may be set equal to a value that is based on road conditions. For example only, the updating threshold may be set equal to approximately 4 or 5 vehicles to eliminate normal traffic flow. Additional higher thresholds such as 10-15 or more vehicles can be used based on the area to indicate that more vehicles are required on a particular road or at a particular intersection before the system determines that there is a traffic problem. If multiple thresholds are employed for various regions within the detection area of the monitors 108 or elsewhere, the threshold may be assigned a measure of certainty. In other words, for a two-lane road, a lower updating threshold value can be used. However, for a four-lane road, a higher threshold such as 15 vehicles may be used to reflect average vehicles in each lane. Other thresholds may be used and the ones included herein are exemplary. Furthermore, the accuracy of satellite image comparison may be sufficient to differentiate between the two-lane road as compared to the four-lane road.

Furthermore, the updating threshold for pedestrian traffic may be set equal to approximately 15 or 20 pedestrian to eliminate normal pedestrian flow. Additional higher thresholds such as 30-45 pedestrians can be used instead of the lower threshold. If multiple thresholds are employed, the threshold may be assigned a measure of certainty. In other words, for a suburb area, a lower updating threshold value can be used. However, for an urban area, a higher threshold such as 30 pedestrian may be used at a particular intersection, road, park, stadium or other gathering place to reflect the average flow of people in a downtown area. Other thresholds may be used. Furthermore, the accuracy of satellite image comparison may be sufficient to differentiate between the suburb area as compared to the urban area.

In step 408, the processing circuitry infers the updating priority of the interested location for the server based on traffic information obtained from the step 404 and/or other information as described previously herein such as weather, safety and other conditions.

Figure 4B:
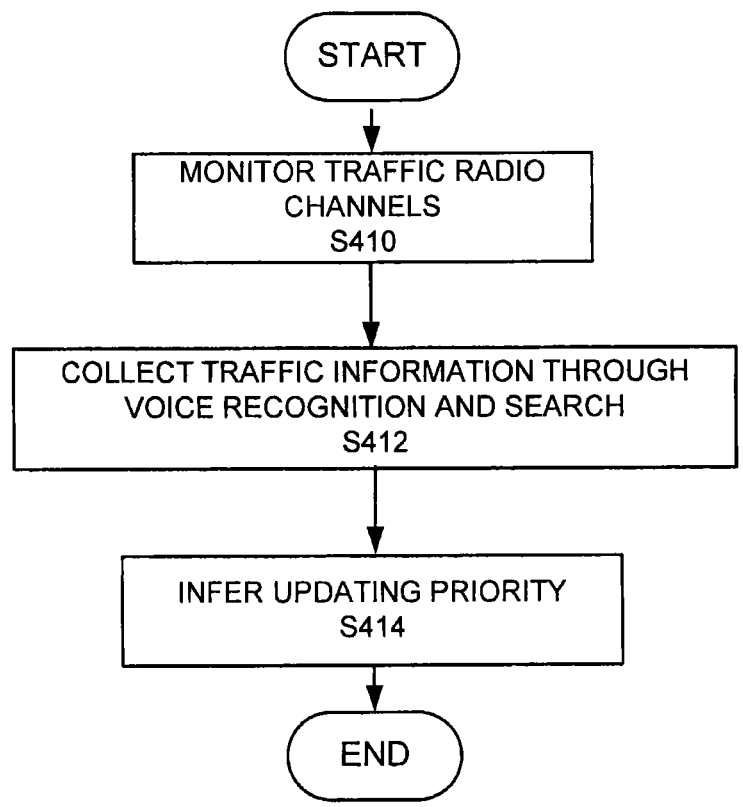

FIG. 4B shows a flowchart describing a method of inferring the traffic information from the radio channels according to one example.

In step 410, the processing circuitry of the backend server 102 constantly monitors the traffic news in radio channels as described previously herein.

In step 412, the processing circuitry further collects traffic related information from the radio channels, converts the voice information into text information, and searches for traffic congestions of the related area of one or more wireless devices 110 or one or more targeted monitors 108.

In step 414, the processing circuitry derives the updating priority of the interested location for the backend server 102 based on traffic information obtained from the step 412 and/or other information described previously herein with respect to the updating priority.

The processing circuitry selectively updates the traffic map based on the updating priority. The processing circuitry analyzes the traffic related information obtained in step 414 and determines the update priority. The processing circuitry may selectively update the traffic information for locations with a higher updating priority at an earlier time than for locations with a lower updating priority. In selected embodiments, the updating priority may be set equal to multiple levels. For example, the updating priority may include three levels, such as a high level, a medium level and a low level.

For example only, the high level updating priority may be set when the obtained traffic information indicates that the traffic level is heavy, or that gridlock exists. The high level updating priority may also be set when there is a construction, an accident or a closure of the road. The high level of the updating priority may be changed or reduced to a lower setting when the backend server 102 determines that the accident is cleared and the closed road is reopened. This can be determined by the backend server 102 for example based on news reports received from the Internet 116 and/or radio 114. The medium level may be set when the obtained traffic information indicates that the traffic level is busy but not at a standstill or that traffic is moving at a predetermined pace based on the information received from the wireless devices 110 and/or satellites 112. The light level may be set when the obtained traffic information indicates that the traffic level is light on the road indicating that traffic is flowing normally or at least above a minimal congestion rate. Other thresholds may be used.

Figure 4C:
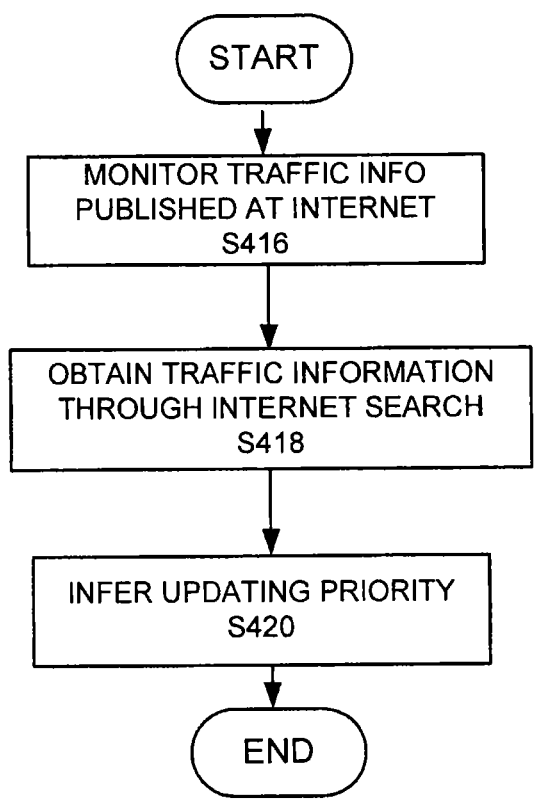

FIG. 4C shows a flowchart describing a method of inferring the traffic information from the internet websites 116 according to one example.

In step 416, the processing circuitry of the backend server 102 constantly monitors the traffic news in internet websites or other networks and/or databases. For example, the backend server 102 may monitor particularly targeted traffic websites or may monitor sites such as Facebook™ or Twitter™ for postings relating to traffic in an area of interest to the backend server 102.

In step 418, the processing circuitry collects traffic related information from the websites and searches for traffic congestions of the related area. Thus, traffic information can be pulled from various sources and collated together to determine an accuracy level of the received information. In other words, a minimal threshold may be established in which all of the information for a particular area must confirm with each other or at least a particular percentage of the information must be similar. If the minimum threshold is met, the backend server 102 may determine that the information is accurate enough to be used to update traffic flow maps. The information may also be used to determine the updating priority.

In step 420, the processing circuitry derives the updating priority of the interested location for the backend server 102 based on traffic information collected from the step 418 and/or from other information as described previously herein.

The processing circuitry of the backend server 102 selectively updates the traffic map based on the updating priority. The processing circuitry analyzes the traffic related information obtained from the step 418 and determines the updating priority. The processing circuitry may selectively update the traffic information for locations with a higher updating priority at an earlier time than for locations with a lower updating priority. The updating priority may be set equal to three levels, such as a high level, a medium level and a low level as described previously herein.

Figure 5:
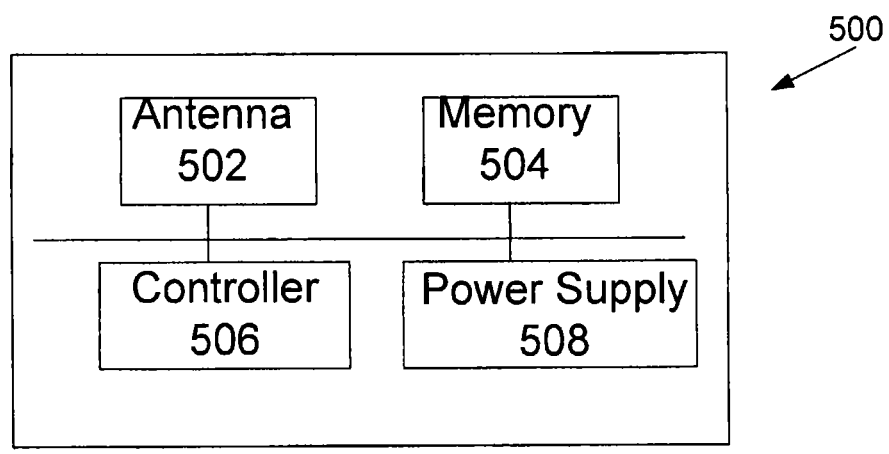
FIG. 5 is a schematic diagram of an exemplary mobile monitor.

Exemplary monitors 108 for detecting the wireless devices 110 are shown in FIG. 5. The monitors 108 are configured to detect wireless signals from the wireless devices 110, communicate this information to the backend server 102, receive information including updated traffic maps from the backend server 102 and send the updated traffic map back to the wireless devices 110. The monitors 108 include a controller 506, such as an application specific integrated circuit, processor, etc., a memory 504, one or more antennas 502 and a power supply. The antenna 502 may be a unidirectional antenna or a directional antenna (e.g., "phase-array antenna"), configured to receive signals from the wireless devices 110 in a monitored area of interest. The controller 506 is configured to process signals from wireless devices 110 via an antenna 502. The monitors 108 may further be configured to store detection data indicating the detected presence of the wireless transmissions from the wireless devices 110 in the memory 504. The monitors 108 may further include a network controller configured to communicate via the network interface 104, and/or associated antenna 502 with the backend server 102, to send the detection data to the backend server 102 over a wireless network connection, respectively.

The wireless devices 110 use communication technologies such as WiFi, Bluetooth or 3G/4G or any other technology. These modern communication technologies assign a unique device ID such as MAC address to the wireless devices 110. Capturing ongoing traffic (including advertisement frames) from these smart devices can be used to extract the MAC address of the wireless devices 110. The monitors 108 can identify each wireless device 110 utilizing this information and can therefore count the number of devices in the vicinity and provide this information to the backend server 102. The backend server 102 can then provide a rough estimate of the crowd densities in the area and determine whether updates need to be made as described previously herein. In alternative embodiments, the monitors 108 themselves may interpret the information they are receiving and perform the steps illustrated in FIG. 2.

For wireless devices 110, WiFi chips may be used and remotely served as a part installed in the wireless device 110. The WiFi chips can be set in a Passive Mode. At the passive mode, the WiFi chips are capable of reading any packets on a WiFi channel, even if not initiated by a wireless device itself. The monitors 108 can contain multiple WiFi chipsets supporting the passive mode that capture ongoing transmissions to detect identities of nearby WiFi-enabled wireless devices 110. In order to increase the capabilities to detect the wireless devices 110, each of the monitors 108 can have more than one chipset, up to the number of channels supported by WiFi. Modern WiFi enabled wireless devices, such as the wireless devices 110 transmit control and data packets that contain the MAC address of the wireless devices in clear text thereby enabling the monitors 108 to detect and count individual wireless devices 110. The monitors 108 can contain multiple WiFi chips to support the passive mode that capture packets transmissions from nearby WiFi-enabled wireless devices 110. In order to increase the capabilities to detect the wireless devices 110, each of the monitors 108 can have more than one WiFi chip, up to the number of channels supported by WiFi.

Figure 6:
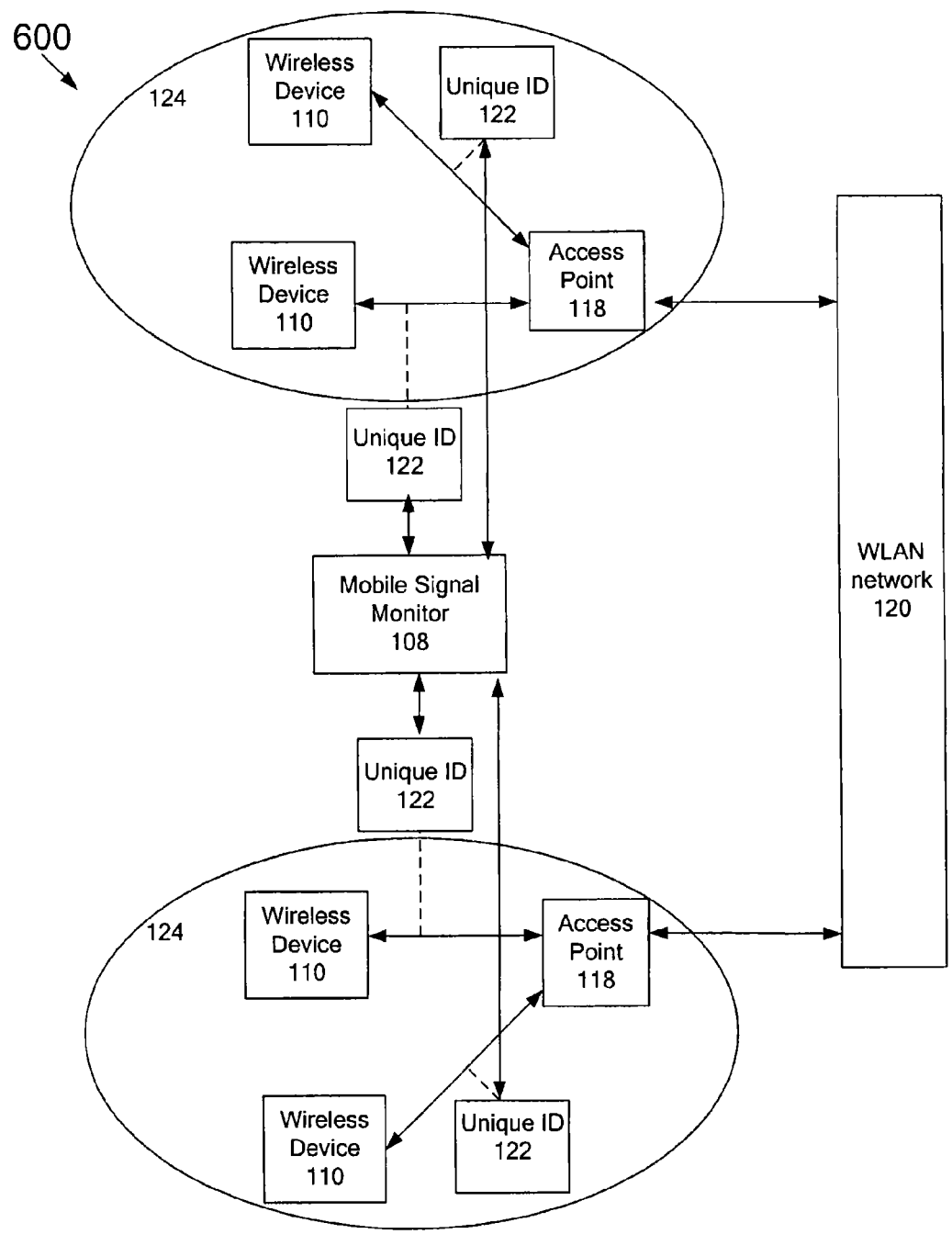
FIG. 6 is a schematic diagram of one embodiment of a WiFi unique ID identification system according to one example.

FIG. 6 is an example diagram illustrating the monitor 108 that detects a unique ID 122 from the WiFi interface. The WiFi network 600 includes a wired portion 120 comprising network devices physically connected to the network by wires (such as metal cables or optical wires). The WiFi network 600 also includes at least one access point 118, the wireless devices 110 and the monitor 108. The access point 118 is communicated to the wired portion 120 of the network. The access point 118 is also capable of communicating wirelessly with mobile devices 110 within the access point's cell 124. Access point 118 is typically configured to function as a bridge between the wireless and wired portions of the WiFi network 400, allowing the wireless devices 110 to communicate with other wireless devices 110 in the WiFi network 600.

Before one wireless device 110 can communicate with other wireless devices 110 on the network, the wireless device 110 must first join the network. In the WiFi network 600, the wireless devices 110 can passively scan each communication channel for a beacon frame transmitted from the access point 118. The beacon frame provides a time synchronization signal for all wireless devices 110 associated with the access point 118. If a wireless device 110 is within the access point 118's cell when the beacon frame is broadcast, the wireless device 110 can establish a connection with the access point 118 by transmitting a probe request frame. Upon receiving the probe request, the access point 118 transmits a probe response to the wireless device 110 containing information necessary to establish communication with the access point 118. Meanwhile, the monitors 108 can passively monitor the probe-request, and obtain information about the unique ID 122 of the wireless devices 110.

Figure 7:
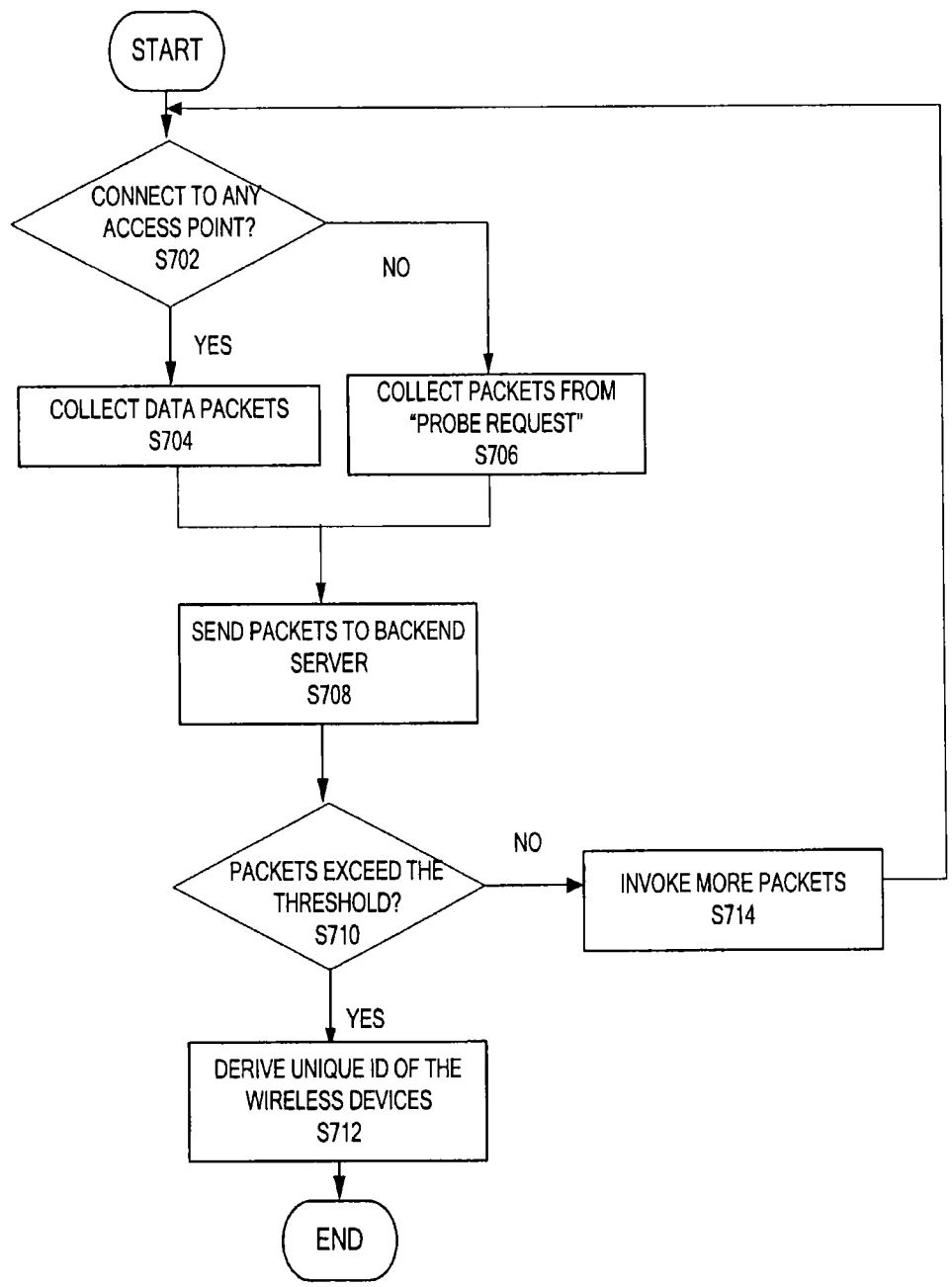
FIG. 7 is a flowchart diagram illustrating a method of collecting packets in a WiFi interface according to one example.

FIG. 7 shows a flowchart describing a method of detecting identities of nearby WiFi-enabled wireless device 110.

In step 702, the mobile signal monitor 108 determines whether the interested mobile device 110 is connected with any access point 118. If the interested mobile device 110 is connected with any access point 118, the mobile device 110 transmits data packets to the access point 118 and the monitor 108 is able to detect the data packets. If the interested mobile device 110 is not connected with any access point 118, the mobile device 110 does not transmit data packets to the access point and the monitor 108 is not able to detect the data packets.

If the interested mobile device 110 is connected with any access point 118, the monitor 108 collects the transmitted data packets from the wireless device 110 at step 704.

If the interested mobile device 110 is not connected with any access point 118, the monitor 108 collects generic lookup packets generated by the "Probe Requests". When a mobile device is away from a network, (e.g., en-route), it performs the probe request by continuously sending generic lookup packets to search for any nearby access point 118 to connect to. In step 706, the unique MAC address of any transmitting device can be collected by passively placing a monitor 108 nearby, which listens to the WiFi channels for probe requests. Probe requests can be specific and contain names of previously connected Service Set Identifications (SSIDs) which are stored in the smart devices' memory, such as, "ATT WIFI", "STARBUCKS_COFFEE", or "NETGEAR".

In a case when the wireless device 110 establishes the connection with a certain access point 118, the wireless device 110 sends less probe requests, but more data packets are exchanged with the access point 118 that the wireless device 110 is connected to. These data packets transmitted from the device 110 also contain MAC Addresses in clear text. Accordingly, by passively monitoring these communications, the monitor 108 can collect more data packets in step 706.

In step 708, the monitor 108 sends the collected packets back to the backend server 102 for processing.

In step 710, in select embodiments and to aid with the reliability of collected data, the processing circuitry in the backend server 102 determines whether a number of the collected packets from one wireless device 110 exceed a packet-threshold value. If the number of the collected packets exceeds the threshold value, the processing circuitry can extract a unique MAC address of the transmitting wireless device 110 in step 712. If not, the processing circuitry has to request that the monitor 108 invoke more packets in step 714. The packet-threshold value can be set manually based on the area in which the monitors 108 and/or access points 114 are located. For example, if the monitors are located within a densely populated area, such as a city, the packet-threshold value may be set to a higher value than if the monitors 108 and/or access points 114 are located in a less densely populated area such as the countryside. By allowing the packet threshold value to be manually set, it allows the system to dynamically update to the appropriate value. For example, an area that is typically may not be that densely populated may have an initial low threshold value but that value may be changed to be a higher packet-threshold value based on events or the time of year within a specific region such as during a pilgrimage.

The threshold number may also be user-defined to achieve a desired power and performance characteristic. For example, the lower the threshold number, the less frequently the processing circuitry needs to invoke a new probe-request. This may result in less power consumption of the monitor 108. Conversely, as the threshold number increases, the monitor 108 can more reliably detect the unique ID 122 from the packets. A threshold time may also be selected and used as a number sufficient to allow for the detection of the unique ID 122.

In a condition when there are not enough packets transmitted from the wireless devices 110 to at least one the monitor 108, methods to invoke more packets from the wireless devices 110 are needed to get better detection within a shorter time-window.

For example, WiFi enabled wireless devices 110 transmit control and data packets that contain the MAC address of the wireless devices 110. When a wireless device 110 is away from a network, it keeps sending generic lookup packets in "Probe Requests" to search for any nearby Access Point 118. By passively placing a monitor 108 nearby to collect the generic lookup packets, the monitor 108 can extract the MAC address of the wireless device 110. When the wireless device 110 is connected to any access point 118, the wireless device 110 sends more data packets to the connected access point 118 instead of generic lookup packets. The data packets transmitted from the wireless device 110 also contain MAC Addresses. By collecting the data packets, the monitor 108 can obtain the MAC address of the wireless device 110. In some cases, more packets from the wireless devices 110 are required to get better detection within a shorter time-window.

One way of invoking more packets is to perform "de-authentication attacks", which is to send the de-authentication packets to the nearby access points 118 and to force them to drop all of current connections with the wireless devices 110. Therefore, the wireless devices 110 have to send "probe requests" again to reestablish their communications with the nearby access points 118.

The method to de-authentication is described below.

Generally speaking, association is the procedure defined in 802.11 standard wherein the wireless devices 110 and the access point 118 establish a wireless connection between them. Techniques for preventing or breaking the association include but are not limited to transmitting one or more spoofed "de-authentication" packets from one or more of the mobile signal monitors 108 with the access point 118's MAC address as source address (e.g. with a reason code "Authentication Expired") to the wireless device 110 or to a broadcast address, and sending one or more spoofed de-authentication packets from one or more of the mobile signal monitors 108 to the accessing point 118 with the wireless device 110's MAC address as source address (e.g., with reason code "Auth Leave"). After the de-authentication packets are received, the access point 118 drops all the connections with the wireless devices 110 nearby. In response, the disconnected wireless devices 110 start to send probe requests as described in step 602 until they are reconnected with access point 118 again. Therefore, more packets are invoked for the monitor 108 to detect.

Another way of invoking more packets is to create fake APs from the monitor 108, by setting the name of each fake AP to one of the popular SSID, and thus, transmitting more packets.

Fake APs can be implemented by deploying real wireless infrastructure resources (e.g., High Interaction Honeypot Technology) like real access points. Alternatively, fake APs can be implemented by deploying devices that emulate the behavior of real resources (called Low Interaction Honeypots) to deceive the user. For example, Honeyd, an Open-source tool, can be used to develop a Honeypot™. Honeyd™ can be adjusted to emulate basic WLAN services and components in multiple ways. It can emulate a fake network routing topology on a wireless environment by creating fake Transmission Control Protocol (TCP)/Internet Protocol (IP) stacks to fool remote OS fingerprinting tools in combination with network infrastructure and network routing emulation. This gives the appearance of actual wireless networks to the wireless device 110.

Fake access point 118 generation tool, such as Black Alchemy's Fake AP™, can also generate thousands of fake access points by manipulating the Basic service set identification (BSSID) and Extended Service Set Identification (ESSID) fields.

In some applications, the information of the wireless devices 110 may be stored with the data packets. Therefore, information about the users of the wireless devices 110 is available to other individuals. The collection of data packets that includes the private information could raise privacy concerns. Therefore, randomizing the MAC address is used on probe requests to alleviate the privacy issues. In order to detect the interested MAC address, the uniqueness of the MAC address during the detection process is important. For scenarios that there is a randomization of the MAC address at every probe request, the method to invoke more packets per probe request and to obtain the interested MAC address of the packet instead of a randomized one can be solutions for the randomization.

Another method to alleviate the privacy issues is to hash the MAC address at the wireless device 110. The wireless device 110 uses a cryptographic hash function to map its MAC address to a hash value. The hash value of the MAC address can be a random sequence of letters and numbers. The attackers of the network are not able to take the hash value and reverse the hash value to get the original MAC address. The wireless device 110 sends the hash value to the monitor 108 and server 102. Therefore, the privacy information contained in the MAC address is not sent or stored in the server 102.

Figure 8:
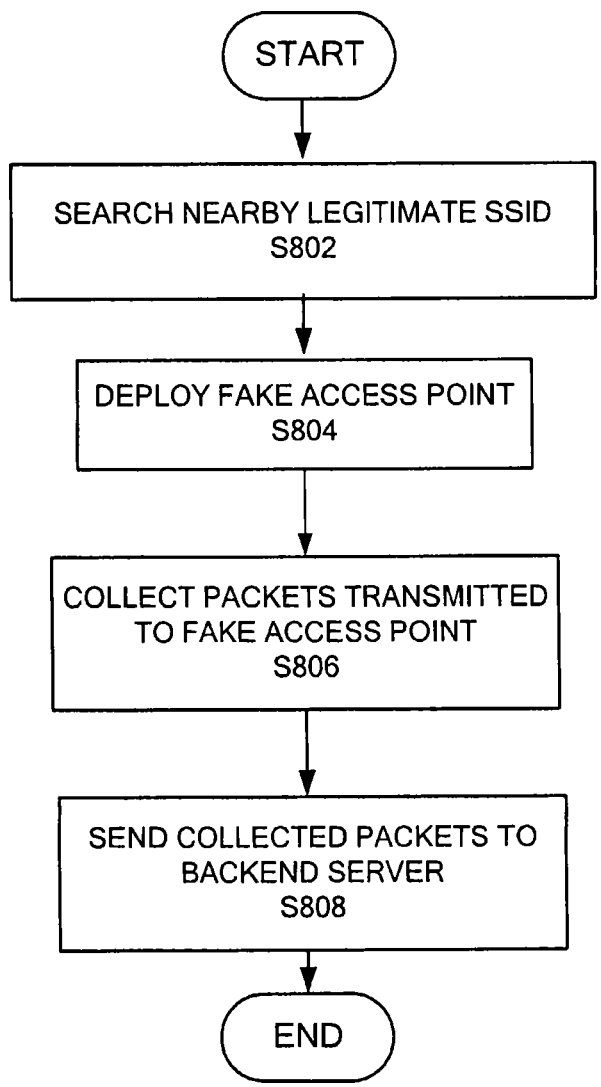
FIG. 8 is a flowchart diagram illustrating a method of generating fake access point according to one example.

FIG. 8 shows a flowchart describing a method of invoking more packets by creating fake access points according to one example.

In step 802, the monitors 108 search neighborhood area to collect and save legitimate SSIDs.

In step 804, the monitors 108 deploy a finite number of fake access points 118, by setting each fake access point 118's name to one of the searched legitimate SSID.

Since it is very likely that some of the nearby wireless devices 110 have some of the collected legitimate SSID on their memory, these wireless devices 110 will start to transmit more packets to the fake access points 118.

In step 806, the monitors 108 collect packets transmitted to the fake access points 118.

In step 808, the monitors 108 send the collected packets to the backend server 102 to detect the unique ID 122 from the wireless devices 110.

For wireless devices 110 that use interfaces such as Bluetooth, enabled Bluetooth interfaces allow the wireless devices 110 to send advertisement packets to the air to advertise their presence. In selected embodiments, the monitors 108 can contain Bluetooth modules which are able to be set into scanning mode and keep searching for available advertisements. The Bluetooth configurations of the wireless devices 110 held by people or inside Bluetooth-Enabled Car-Audio Systems are set to "Detectable" mode, which ensure they will be read by the monitors 108. The monitors 108 are capable of detecting the wireless devices 110 and extracting their MAC address and Signal Strength, etc.

For wireless devices 110 that use interfaces such as GSM/3G/4G, the wireless devices 110 are assigned unique ID 122 names TMSI that is dynamically assigned either by time, or physical tower, or both when they are once connected to the mobile tower. TMSI number is exchanged over the air, similar to MAC address.

The system architecture can be either one-way or two-way. For one way communication, while the wireless devices 110 perform transmit data and the monitors 108 capture those data transmissions, the users do not participate in the process except by enabling their Bluetooth or WiFi interfaces. The data collected by the monitors 108 is sent using any communication interface to the backend server 102 to be processes and analyzed. Using stored historical data and statistical inferences; it is possible to estimate the crowd and transportation densities based on the amount of acquired MAC address.

Two-way communication can be implemented through web-services or applications for the wireless devices 110. Users can download mobile applications and install the applications. These applications will not only provide the traffic information on the wireless devices 110, but they can run on the background of the wireless devices 110 and can collect GPS data and send it back to the backend server 102 using their data plans. In this way, more data points are transmitted to the mobile signal monitors 108. These additional data points can enrich the amount of data collected and thus improve the overall service quality.

The mobile applications can still provide data points even without mobile data plans or service. The mobile applications can transmit data points through directly or indirectly triggering advertisements in Bluetooth interfaces, or sending probe-request and data pockets in WiFi interfaces. Indirect packet triggering can happen when an activity is triggered and lead to transmit more packets. For example, a WiFi scan can be triggered, resulting in transmitting probe requests. This way, more data points can be transmitted from the wireless devices 110 without mobile data plans, or cellular connectivity. The mobile applications can allow logging into the backend server 102's WiFi interface and download traffic status, or upload GPS traces.

The monitoring method can also be implemented by deploying Bluetooth Low Energy (BLE) Tags on cars, busses, and other transportation devices and equipment. Periodic BLE transmissions can be used with the monitor 108 that locate tags using BLE signal emitted by directional transceivers (DT). DTs are generally comprised of multiple antennas provided in an array. The DT may transmit a signal sequentially using several antennas and the monitor 108 receives the signal using a single antenna. The monitor 108 transmits the received signal to the backend server 102 through the network 104. The backend server 102 then calculates the direction vector from the DT based on the DT antenna switching pattern of the transmitted signal and the DT antenna array calibration pattern.

Moreover, an "asset tracking" of operation can be used. In the "asset tracking" mode, BLE transceivers that are attached to tags, emit signals that are received by the monitor 108. The signals are data packets that enable the monitor 108 to identify the tag. The monitor 108 transmits the received signal to the backend server 102 through the network 104. The backend server 102 then calculates the direction vector from the DT towards the tag based on received signals.

The BLE tags supporting "asset tracking" mode can be particularly small and inexpensive. The BLE tags may include a battery, microcontroller, and radio transceiver. It may be configured to transmit periodically a signal in order to enable determination of positions of the tag. The positions can be used for tracking an object to which the tag is associated. Typical frequencies of transmissions and thus of enabled location updates are less than 10 times per second.

BLE tags are directed to low power applications. The wireless devices 110 use BLE will only consume a fraction of the power of conventional Bluetooth enabled devices. This will allow the wireless devices 110 to expand their battery life. And the monitor 108 can remain continuously "on" as opposed to cycling between "on" mode and sleep mode. Accordingly, the system described herein not only provides enhanced communication paradigms but enhances various technology areas such as power saving paradigms within electrical communication devices, enhanced tracking and reliability determinations with respect to detected information thereby providing enhanced data management schemes, and enhanced crowd sourcing techniques for actively monitoring crowd data.

Figure 9:
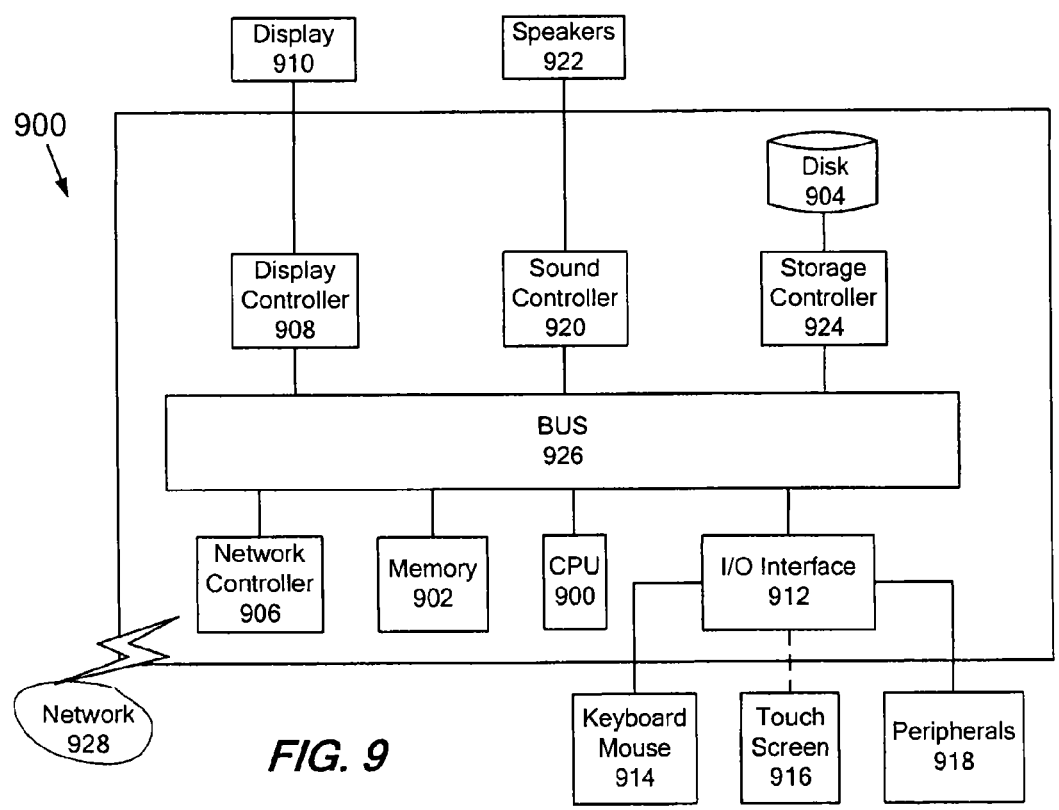
FIG. 9 is a schematic diagram of an exemplary processing system according to one example.

Next, a hardware description of the backend server 102 according to exemplary embodiments is described with reference to FIG. 9. In FIG. 9, the device includes the processing circuitry, or a CPU 900, which performs the processes described above. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The device in FIG. 9 also includes a network controller 906, such as an Intel Ethernet PRO network interface card from Intel Corporation of America, for interfacing with network 928. As can be appreciated, the network 928 can be a public network, such as the Internet, or a private network such as an LAN or WAN network, or any combination thereof and can also include PSTN or ISDN sub-networks. The network 928 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 618 including printers and scanners, such as an OfficeJet or DeskJet from Hewlett Packard.

A sound controller 920 is also provided in the device, such as Sound Blaster X-Fi Titanium from Creative, to interface with speakers/microphone 922 hereby providing sounds and/or music. The general purpose storage controller 924 connects the storage medium disk 604 with communication bus 926, which may be an ISA, EISA, VESA, PCI, or similar, for interconnecting all of the components of the device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

EXEMPLARY IMPLEMENTATIONS

Traffic Update

A. A traffic update method implemented by a mobile monitoring system including in part a server and at least one monitoring device, comprising:
collecting, at the at least one monitoring device, signals emitted from one or more wireless devices;
collecting, at the server, traffic information from at least one of satellite, radio channel and network sources;
analyzing, at the server, the collected signals and the traffic information to identify at least one traffic flow according to travel routes of the one or more wireless devices;
determining, at the server, whether the identified at least one traffic flow exceeds an updating threshold based on the collected signals;
deriving, at the server, when the traffic flow exceeds the updating threshold, an updating priority indicating an order in which the traffic flows are processed based on the collected signals; and
updating, at the server, a dynamic traffic transportation plan map based on the at least one traffic flow, the updating threshold and the updating priority.

B. The method of Claim A, wherein the signals include information identifying the number of vehicles and/or pedestrians within a predetermined area near the at least one monitoring device.

C. The method of Claim B, wherein the server sets the updating threshold as a function of the number of vehicles and/or pedestrians.

D. The method of Claim A, wherein the server sets the updating threshold as a function of the collected traffic information.

E. The method of Claim A, wherein the server sets the updating threshold as a function of the collected signals and the collected traffic information.

F. The method of Claim A, wherein the server selectively updates the dynamic traffic transportation plan map for locations with a higher updating priority before updating the dynamic traffic transportation plan map for locations with a lower updating priority.

G. The method of Claim A, wherein the server transmits the updated dynamic traffic transportation plan map to an external device.

H. The method of Claim A, wherein the server transmits the updated dynamic traffic transportation plan map to at least one wireless device via the at least one monitoring device.

I. The method of Claim A, wherein the signals include at least one a wifi signal, a GPS signal, a bluetooth signal, a zigbee signal, a 3G signal, a 4G signal and a 5G signal.

J. The method of Claim A, wherein the determining step further includes:
comparing traffic information from at least one satellite with a reference map, the traffic information include satellite imagery;
determining whether a traffic difference from the comparison exceeds the updating threshold, and
the deriving step further includes inferring the updating priority based on priority levels set by the server as a function of the comparing.

K. The method of Claim A, wherein the deriving step further includes:
monitoring traffic news from the radio channels;
obtaining traffic congestion information via the monitoring of the traffic news; and
inferring the updating priority based on priority levels set by the server as a function of the obtained radio traffic congestion information.

L. The method of Claim A, wherein the deriving step further includes:
monitoring traffic news from the network sources;
obtaining internet traffic congestion information by searching through the traffic news; and
inferring the updating priority based on priority levels set by the server as a function of the obtained internet traffic congestion information.

M. The method of Claim A, wherein the server identifies different levels of accuracy for the traffic information based on source of collected signals.

N. The method of Claim M, wherein the server identifies signals received from the at least one wireless device via the at least one monitor device as having a high accuracy level.

O. The method of Claim M, wherein the server identifies signals received from the at least one of the satellites, radio channels, and network sources as having lower accuracy than
the accuracy of signals received from the at least one wireless device.

P. A monitoring system for automatically detecting traffic flows, comprising:
one or more monitoring devices configured to collect wireless signals emitted from one or more wireless devices; and
a server configured to
collect traffic information from at least one of satellite, radio channel and network sources;
analyze the collected signals and the traffic information to identify at least one traffic flow according to travel routes of the one or more wireless devices;
determine whether the identified at least one traffic flow exceeds an updating threshold based on the collected signals;
derive, when the traffic flow exceeds the updating threshold, an updating priority indicating an order in which the traffic flows are processed based on the collected signals; and update a dynamic traffic transportation plan map based on the at least one traffic flow, the updating threshold and the updating priority.

Q. The system of Claim P, wherein the server further derives the updating priority through the satellite by:
comparing traffic information from at least one satellite with a reference map, the traffic information include satellite imagery;
determining whether a traffic difference from the comparison exceeds the updating threshold, and
the deriving step further includes inferring the updating priority based on priority levels set by the server as a function of the comparing.

R. The system of Claim P, wherein the server is further configured to derive the updating priority by:
monitoring traffic news from the radio channels;
obtaining traffic congestion information via the monitoring of the traffic news; and
inferring the updating priority based on priority levels set by the server as a function of the obtained radio traffic congestion information.

S. The system of Claim P, wherein the server is further configured to derive the updating priority by:
monitoring traffic news from the network sources;
obtaining Internet traffic congestion information by searching through the traffic news; and
inferring the updating priority based on priority levels set by the server as a function of the obtained internet traffic congestion information.

T. A monitoring server for automatically detecting traffic flows, the server comprising:
processing circuitry configured to
  collect traffic information from at least one of satellite, radio channel and network sources;
  analyze the collected signals and the traffic information to identify at least one traffic flow according to travel routes of the one or more wireless devices;
  determine whether the identified at least one traffic flow exceeds an updating threshold based on the collected signals;
  derive, when the traffic flow exceeds the updating threshold, an updating priority indicating an order in which the traffic flows are processed based on the collected signals; and
  update a dynamic traffic transportation plan map based on the at least one traffic flow, the updating threshold and the updating priority.

Unique Identifiers Detection

A. A method implemented by a mobile monitoring system for detecting unique identifiers (ID) from wireless devices, comprising:
collecting, at a receiver of a monitoring device, one or more information packets transmitted from one or more wireless devices;
determining, with processing circuitry of the monitoring device, whether the collected packets exceed a packet-threshold to determine whether or not to extract a unique ID for each of the one or more wireless devices;
invoking, with the processing circuitry and when it is determined that the collected packets do not exceed the packet threshold, more information packets to be transmitted from the one or more wireless devices until the invoked information packets exceed the packet-threshold;
extracting, with the processing circuitry, the unique IDs from the information packets that exceed the packet-threshold;
inferring, at a server, a crowd density and traffic condition based on the unique IDs; and
transmitting, from the server, a traffic estimation to the one or more wireless devices based on the crown density and traffic condition.

B. The method of claim A, further comprising: providing, from the server, a web service that allows the one or more wireless devices to log into a WiFi interface to download the traffic estimation and upload one or more GPS traces.

C. The method of claim A, the collecting step further includes collecting packets from the wireless devices with at least one of WiFi interfaces, Bluetooth interfaces, and mobile interfaces.

D. The method of claim C, wherein the collecting step further includes collecting one or more look-up packets that are sent by the one or more wireless devices to search for one or more nearby access points.

E. The method of claim D, wherein the collecting step further includes collecting one or more data packets exchanged between the one or more wireless device devices and the one or more access points.

F. The method of claim E, wherein the collecting step further includes capturing, one or more advertisement packets from one or more Bluetooth modules.

G. The method of claim A, wherein the invoking step further includes creating one or more fake access points by:
searching an area to collect one or more legitimate service set identifications (SSIDs); and
deploying one or more fake access points by naming each of the fake access points one of the legitimate SSIDs.

H. The method of claim A, wherein the invoking step further includes:
sending one or more de-authentication attacks to one or more nearby access points to force the one or more access points to drop one or more connections with the one or more wireless devices, and
collecting one or more new information packets collected in response to the one or more wireless devices re-establishing communication with the one or more access points.

I. The method of claim A, wherein the inferring step further includes identifying and analyzing at least one of a media access control address (MAC), a Temporary Mobile Subscriber Identity (TMSI), an International mobile Subscriber Identity (IMSI), a Temporary International Mobile Subscriber Identity (TIMSI), and an International Mobile Station Equipment Identity (IMEI).

J. A monitoring system for automatically detecting unique identifiers (ID) from wireless devices, comprising:
one or more mobile monitoring devices configured to collect wireless signals emitted from the one or more wireless devices, each mobile monitoring device including
  a memory configured to store the signals, and
  a receiver configured to collect one or more information packets transmitted from one or more wireless devices, and
  a transmitter configured to transmit the collected information packets to a server, the server including processing circuitry configured to
  determine whether the collected packets exceed a packet-threshold to determine whether or not to extract a unique ID for each of the one or more wireless devices, invoke, when it is determined that the collected packets do not exceed the packet threshold, more information packets to be transmitted from the one or more wireless devices until the invoked information packets exceed the packet-threshold, extract the unique IDs from the information packets that exceed the packet-threshold, infer a crowd density and traffic condition based on the unique IDs, and transmit a traffic estimation to the one or more wireless devices based on the crown density and traffic condition.

K. The system of claim J, wherein the server further provides a web service that allows the one or more wireless devices to log into a WiFi interface to download the traffic estimation and upload one or more GPS traces.

L. The system of claim J, the receiver collects packets from the wireless devices with at least one of WiFi interfaces, Bluetooth interfaces, and mobile interfaces.

M. The system of claim L, wherein the receiver collects one or more look-up packets that are sent by the one or more wireless devices to search for one or more nearby access points.

N. The system of claim M, wherein the receiver collects one or more data packets exchanged between the one or more wireless device devices and the one or more access points.

O. The system of claim N, wherein the one or more monitoring devices capture one or more advertisement packets from one or more Bluetooth module.

P. The system of claim J, wherein the one or more monitoring devices create one or more fake access points by:

searching an area to collect one or more legitimate service set identifications (SSIDs); and deploying one or more fake access points by naming each of the fake access points one of the legitimate SSIDs.

Q. The system of claim J, wherein the one or more monitoring devices perform a de-authentication attack by:

sending one or more de-authentication attacks to one or more nearby access points to force the one or more access points to drop one or more connections with the one or more wireless devices, and collect one or more new information packets collected in response to the one or more wireless devices re-establishing communication with the one or more access points.

R. The system of claim J, wherein the inferring by the server includes identifying and analyzing at least one of a media access control address (MAC), a Temporary Mobile Subscriber Identity (TMSI), an International mobile Subscriber Identity (IMSI), a Temporary International Mobile Subscriber Identity (TIMSI), and an International Mobile Station Equipment Identity (IMEI), wherein the mobile monitoring devices at different site of the route collect cumulative information from the one or more wireless devices.

S. A computer-readable medium storing executable instructions, which when executed by a computer, cause the computer to execute a method comprising:

collecting one or more information packets transmitted from one or more wireless devices;

determining whether the collected packets exceed a packet-threshold to determine whether or not to extract a unique ID for each of the one or more wireless devices;

invoking, when it is determined that the collected packets do not exceed the packet threshold, more information packets to be transmitted from the one or more wireless devices until the invoked information packets exceed the packet-threshold;

extracting the unique IDs from the information packets that exceed the packet-threshold;

inferring a crowd density and traffic condition based on the unique IDs; and transmitting a traffic estimation to the one or more wireless devices based on the crown density and the traffic congestion.

The invention claimed is:

1. A traffic update method implemented by a mobile monitoring system including in part a server and at least one monitoring device, comprising:

collecting, at the at least one monitoring device, signals emitted from one or more wireless devices;

collecting, at the server, traffic information from one or more sources including at least one of satellite, radio channel and network sources;

determining an accuracy level of the traffic information based on the one or more sources providing the traffic information or an amount of correspondence between the one or more sources, analyzing, at the server, the collected signals and the traffic information to identify at least one traffic flow according to travel routes of the one or more wireless devices;

determining, at the server, whether the identified at least one traffic flow exceeds an updating threshold based on the collected signals;

deriving, at the server, when the traffic flow exceeds the updating threshold, an updating priority indicating an order in which the traffic flows are processed based on the collected signals; and updating, at the server, a dynamic traffic transportation plan map based on the at least one traffic flow, the updating threshold, the updating priority, and the accuracy level of the traffic information.

2. The method of claim 1, wherein the signals include information identifying the number of vehicles and/or pedestrians within a predetermined area near the at least one monitoring device.

3. The method of claim 2, wherein the server sets the updating threshold as a function of the number of vehicles and/or pedestrians.

4. The method of claim 1, wherein the server sets the updating threshold as a function of the collected traffic information.

5. The method of claim 1, wherein the server sets the updating threshold as a function of the collected signals and the collected traffic information.

6. The method of claim 1, wherein the server selectively updates the dynamic traffic transportation plan map for locations with a higher updating priority before updating the dynamic traffic transportation plan map for locations with a lower updating priority.

7. The method of claim 1, wherein the server transmits the updated dynamic traffic transportation plan map to an external device.

8. The method of claim 1, wherein the server transmits the updated dynamic traffic transportation plan map to at least one wireless device via the at least one monitoring device.

9. The method of claim 1, wherein the determining step further includes:

comparing traffic information from at least one satellite with a reference map, the traffic information include satellite imagery;

determining whether a traffic difference from the comparison exceeds the updating threshold, and the deriving step further includes inferring the updating priority based on priority levels set by the server as a function of the comparing.

10. The method of claim 1, wherein the deriving step further includes:

monitoring traffic news from the radio channels;

obtaining traffic congestion information via the monitoring of the traffic news; and inferring the updating priority based on priority levels set by the server as a function of the obtained radio traffic congestion information.

11. The method of claim 1, wherein the deriving step further includes:

monitoring traffic news from the network sources;

obtaining internet traffic congestion information by searching through the traffic news; and inferring the updating priority based on priority levels set by the server as a function of the obtained internet traffic congestion information.

12. The method of claim 1, wherein the server identifies signals received from the at least one wireless device via the at least one monitor device as having a high accuracy level.

13. The method of claim 1, wherein the server identifies signals received from the at least one of the satellites, radio channels, and network sources as having lower accuracy than the accuracy of signals received from the at least one wireless device.

14. The method of claim 1, wherein the server updates the dynamic traffic transportation plan map when the accuracy level of the traffic information is greater than a predetermined threshold.

15. A monitoring system for automatically detecting traffic flows, comprising:

one or more monitoring devices configured to collect wireless signals emitted from one or more wireless devices; and a server configured to collect traffic information from one or more sources including at least one of satellite, radio channel and network sources;

determine an accuracy level of the traffic information based on the one or more sources providing the traffic information or an amount of correspondence between the one or more sources;

analyze the collected signals and the traffic information to identify at least one traffic flow according to travel routes of the one or more wireless devices;

determine whether the identified at least one traffic flow exceeds an updating threshold based on the collected signals;

derive, when the traffic flow exceeds the updating threshold, an updating priority indicating an order in which the traffic flows are processed based on the collected signals; and update a dynamic traffic transportation plan map based on the at least one traffic flow, the updating threshold, the updating priority, and the accuracy level of the traffic information.

16. The system of claim 15, wherein the server further derives the updating priority through the satellite by:

comparing traffic information from at least one satellite with a reference map, the traffic information include satellite imagery;

determining whether a traffic difference from the comparison exceeds the updating threshold, and the deriving step further includes inferring the updating priority based on priority levels set by the server as a function of the comparing.

17. The system of claim 15, wherein the server is further configured to derive the updating priority by:

monitoring traffic news from the radio channels;

obtaining traffic congestion information via the monitoring of the traffic news; and inferring the updating priority based on priority levels set by the server as a function of the obtained radio traffic congestion information.

18. The system of claim 15, wherein the server is further configured to derive the updating priority by:

monitoring traffic news from the network sources;

obtaining interne traffic congestion information by searching through the traffic news; and inferring the updating priority based on priority levels set by the server as a function of the obtained internet traffic congestion information.

19. A monitoring server for automatically detecting traffic flows, the server comprising:

processing circuitry configured to collect traffic information from one or more sources including at least one of satellite, radio channel and network sources;

determine an accuracy level of the traffic information based on the one or more sources providing the traffic information or an amount of correspondence between the one or more sources;

analyze the collected signals and the traffic information to identify at least one traffic flow according to travel routes of the one or more wireless devices;

determine whether the identified at least one traffic flow exceeds an updating threshold based on the collected signals;

derive, when the traffic flow exceeds the updating threshold, an updating priority indicating an order in which the traffic flows are processed based on the collected signals; and update a dynamic traffic transportation plan map based on the at least one traffic flow, the updating threshold, the updating priority, and the accuracy level of the traffic information.

20. The monitoring server of claim 19, wherein the processing circuitry is further configured to update the dynamic traffic transportation plan map when the accuracy level of the traffic information is greater than a predetermined threshold.

* * * * *